US011245817B2

(12) United States Patent
Sebree

(10) Patent No.: US 11,245,817 B2
(45) Date of Patent: Feb. 8, 2022

(54) HIGH TEMPERATURE VIDEO CAMERA SYSTEM

(71) Applicant: Honda Motor Co., Ltd., Tokyo (JP)

(72) Inventor: Jared D. Sebree, Franklin, IN (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/750,482

(22) Filed: Jan. 23, 2020

(65) Prior Publication Data

US 2021/0234994 A1  Jul. 29, 2021

(51) Int. Cl.
*H04N 5/225* (2006.01)

(52) U.S. Cl.
CPC .................... *H04N 5/2252* (2013.01)

(58) Field of Classification Search
CPC ..................................................... H04N 5/2252
See application file for complete search history.

(56) References Cited

U.S. PATENT DOCUMENTS

| 6,069,652 | A | 5/2000 | Eversole et al. | |
|---|---|---|---|---|
| 6,080,101 | A * | 6/2000 | Tatsuno | A61B 1/00124 348/65 |
| 6,778,209 | B1 * | 8/2004 | Eversole | H04N 5/2252 348/65 |
| 6,864,365 | B1 * | 3/2005 | White | C07K 14/55 536/23.7 |
| 9,357,110 | B2 | 5/2016 | Wong et al. | |
| 10,588,178 | B1 * | 3/2020 | Nelson | H04N 5/22521 |
| 2006/0193129 | A1 | 8/2006 | Opolka | |
| 2019/0246074 | A1 | 8/2019 | Sebree et al. | |

FOREIGN PATENT DOCUMENTS

| CN | 204046703 | 12/2014 |
|---|---|---|
| CN | 104507286 | 4/2015 |
| CN | 205350719 | 6/2016 |
| CN | 105744123 | 7/2016 |
| CN | 208316867 | 1/2019 |
| WO | 2003083569 | 10/2003 |
| WO | 2013078960 | 6/2013 |
| WO | 2014021089 | 2/2014 |

OTHER PUBLICATIONS

Thermal Camera Enclosures for High Temperature, https://movitherm.com/products/enclosures/high-temperature/, 2018, Irvine, USA.

* cited by examiner

*Primary Examiner* — Gevell V Selby
(74) *Attorney, Agent, or Firm* — Rankin, Hill & Clark LLP

(57) ABSTRACT

A housing for a high temperature video camera system includes a support and a conductor. The support has at least one compartment defined therein, the at least one compartment being airtight with respect to a support exterior and configured for accommodating at least one of a camera and a battery. A plurality of insulation layers is stacked in a linear direction to form the support, including the at least one compartment, where an outer periphery of each insulation layer of the plurality of insulation layers defines the support exterior. A conductor interposed between at least one pair of immediately adjacent insulation layers of the plurality of insulation layers and extends from the at least one compartment to the support exterior. The conductor connects a plurality of exterior lights disposed external to the support with a battery disposed in the at least one compartment.

19 Claims, 6 Drawing Sheets

HIGH TEMPERATURE VIDEO CAMERA SYSTEM

BACKGROUND

It is sometimes necessary or desirable to use cameras for capturing video or pictures in locations that are out of reach or difficult to view under normal circumstances. For example, places of elevated temperature can be difficult for cameras due to the tendency of conventional video/camera equipment shutting down (e.g., at temperatures above about 130° F. or 54.4° C.). While some cameras and camera systems are known for handling such elevated temperature operating environments, these tend to be immobile (i.e., not very portable), expensive, complicated, etc. Accordingly, a current challenge in conventional camera systems is reducing overall complexity and associated cost in high temperature configurations effective for inhibiting heat transfer to camera equipment.

BRIEF DESCRIPTION

According to one aspect, a housing for a high temperature video camera system includes a support and a conductor. The support has at least one compartment defined therein, the at least one compartment being airtight with respect to a support exterior and configured for accommodating at least one of a camera and a battery. A plurality of insulation layers stacked in a linear direction forms the support including the at least one compartment, where an outer periphery of each insulation layer of the plurality of insulation layers defines the support exterior. The conductor is interposed between at least one pair of immediately adjacent insulation layers of the plurality of insulation layers and extends from the at least one compartment to the support exterior.

According to another aspect, a housing for a high temperature video camera system includes a support, a conductor, and a casing. The support has at least one compartment defined therein, the at least one compartment being airtight with respect to a support exterior and configured for accommodating at least one of a camera and a battery. A plurality of insulation layers stacked with each other form the support. The conductor extends through at least one pair of immediately adjacent insulation layers included in the plurality of insulation layers forming the support, the conductor extending from the at least one compartment to the support exterior. The casing is disposed around the support and compresses the support so as to hermetically seal the at least one pair of adjacent insulation layers around the conductor, and hermetically seal the at least one compartment from the support exterior.

According to another aspect, a method for assembling a housing for a high temperature video camera system includes stacking a plurality of insulation layers in a linear direction to form a support such that an outer periphery of each insulation layer of the plurality of insulation layers defines a support exterior, and such that the support has at least one compartment defined therein. The method also includes disposing a conductor interposed between a pair of immediately adjacent insulation layers of the plurality of insulation layers such that the conductor extends from the at least one compartment to the support exterior. The method also includes compressing the support in the linear direction so as to hermetically seal the pair of adjacent insulation layers around the conductor, and to hermetically seal the at least one compartment from the support exterior.

DETAILED DESCRIPTION

Figure 1:
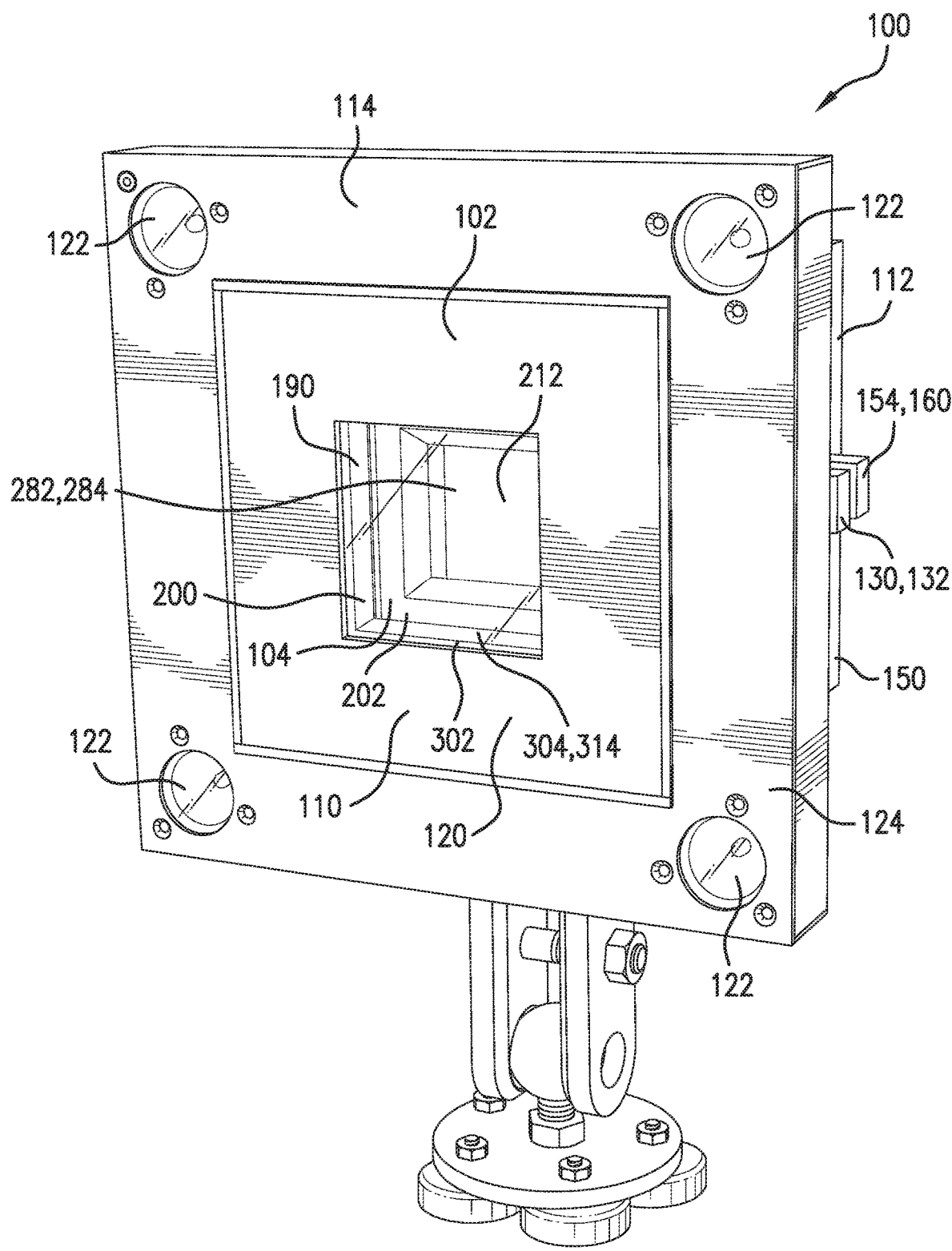
FIG. 1 is a perspective view of a housing for a high temperature video camera system.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 depicts a housing for a high temperature video camera system 100 including a casing 102 and a support 104 disposed in the casing 102. As shown, the casing 102 includes a first casing end portion 110 and a second casing end portion 112 fixed to the first casing end portion 110, where the first casing end portion 110 is located on a side of the casing 102 opposite from the second casing end portion 112. A light bezel 114 is removably attached to the first casing end portion 110 about a perimeter of the first casing end portion 110 at a first portion front end 120 of the first casing end portion 110.

The light bezel 114 features a plurality of exterior lights 122 disposed on a front surface 124 of the light bezel 114 and directed forward from the high temperature video camera system 100. Specifically, the depicted embodiment features four Xenon lights as the exterior lights 122 configured for providing sufficient lighting for video and for withstanding a relatively high ambient temperature. Notably, alternative lighting configurations and types may be employed as the plurality of exterior lights 122 to provide sufficient video lighting configured for withstanding a high temperature environment without departing from the scope of the present disclosure.

Figure 2:
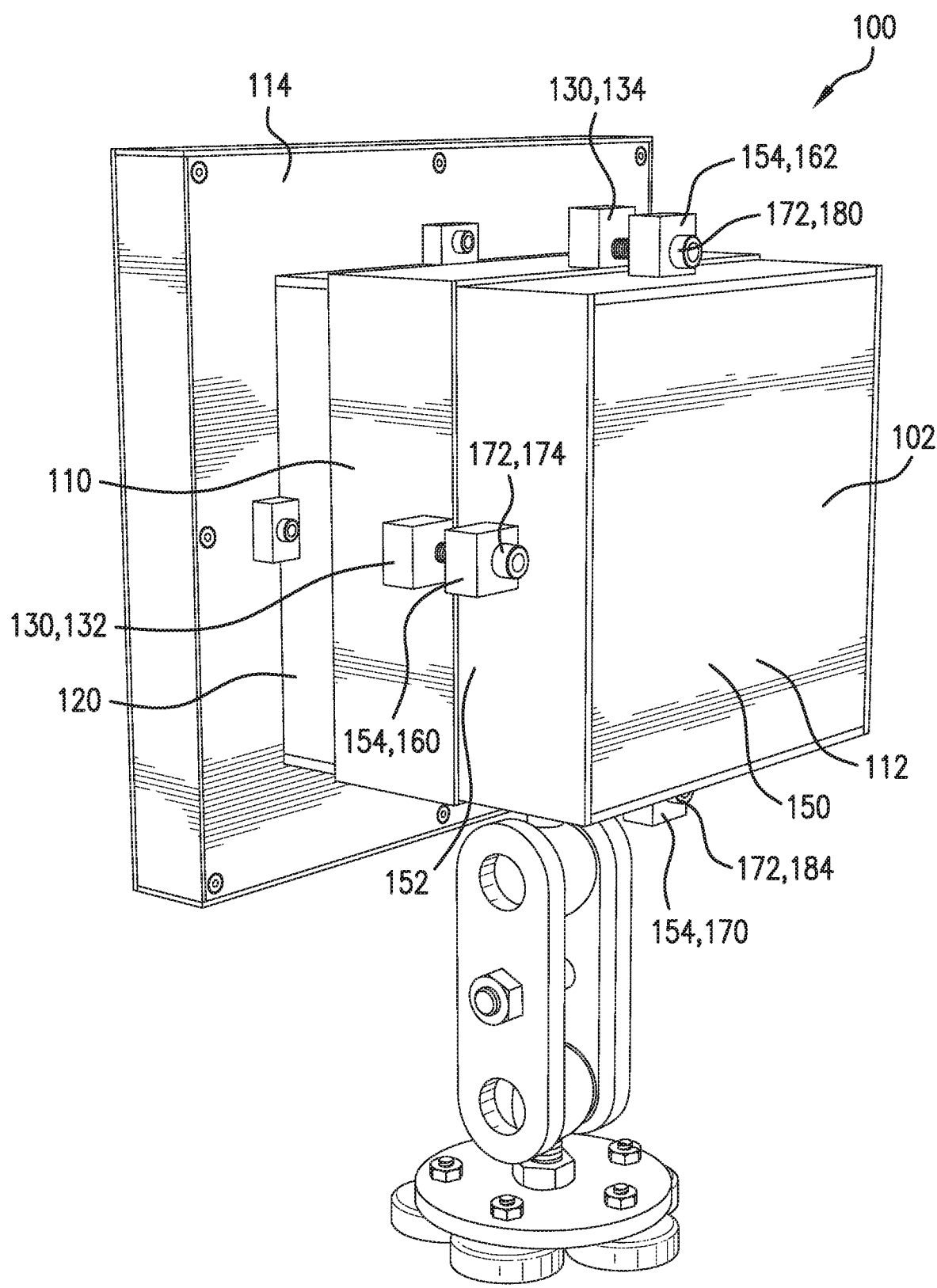
FIG. 2 is a perspective view of the housing.
Figure 6:
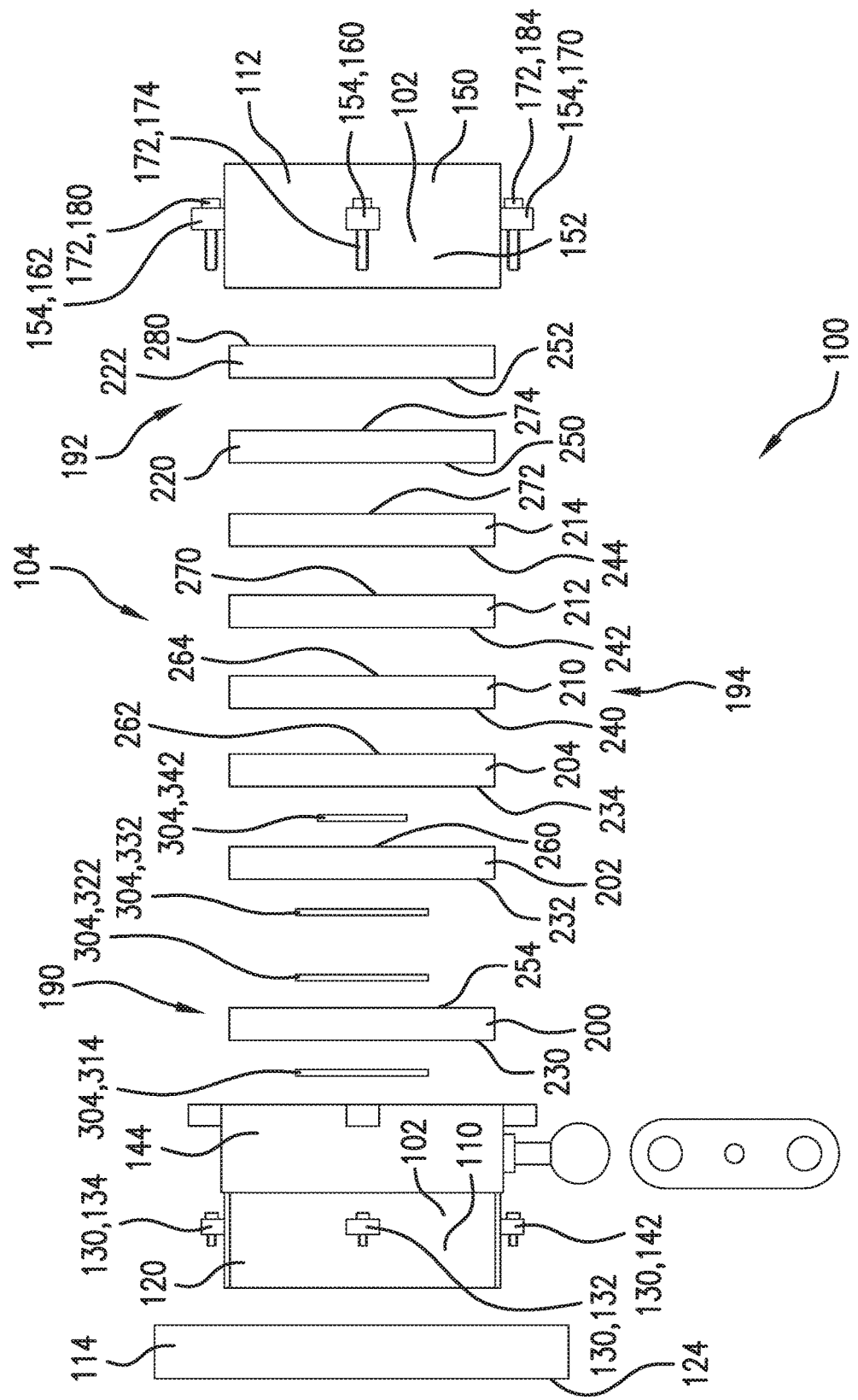
FIG. 6 is an exploded side view of the housing.

As shown in FIG. 2, the first casing end portion 110 features a first plurality of flanges 130 disposed thereon. The first plurality of flanges 130 includes a first front flange 132, a second front flange 134, a third front flange (not shown), and a fourth front flange 142 (FIG. 6). The first front flange 132 extends laterally outward from a first portion back end 144 of the first casing end portion 110, and the second front flange 134 extends vertically outward from the first portion back end 144. The third front flange extends laterally outward from the first portion back end 144 from a side of the first portion back end 144 opposite from the first front flange 132, and the fourth front flange 142 extends vertically outward from the first portion back end 144 from a side of the first portion back end 144 opposite from the second front flange 134.

The second casing end portion 112 includes a second portion back end 150 and a second portion front end 152 disposed on a side of the second casing end portion 112 opposite from the second portion back end 150 and configured to connect with the first portion back end 144. Similar to the first plurality of flanges 130 extending outward from the first portion back end 144, the second casing end portion 112 features a second plurality of flanges 154 disposed thereon. The second plurality of flanges 154 includes a first back flange 160 corresponding with the first front flange 132, a second back flange 162 corresponding with the second front flange 134, a third back flange (not shown) corresponding with the third front flange, and a fourth back flange 170 corresponding with the fourth front flange 142. The first back flange 160 extends laterally outward from the second portion front end 152, and the second back flange 162 extends vertically outward from the second portion front end 152, the third back flange extends laterally outward from the second portion front end 152 from a side of the second portion front end 152 opposite from the first back flange 160, and the fourth back flange 170 extends vertically outward from the second portion front end 152 from a side of the second portion front end 152 opposite from the second back flange 162.

The first portion back end 144 and the second portion front end 152 are arranged such that the first plurality of flanges 130 cooperates with the second plurality of flanges 154, aligning the first front flange 132 with the first back flange 160, the second front flange 134 with the second back flange 162, the third front flange with the third back flange, and the fourth front flange 142 with the fourth back flange 170. The first plurality of flanges 130 and the second plurality of flanges 154 are fixed to each other with a plurality of bolts 172, where the first front flange 132 is connected to the first back flange 160 with a first bolt 174, the second front flange 134 is connected to the second back flange 162 with a second bolt 180, the third front flange is connected to the third back flange with a third bolt (not shown), and the fourth front flange 142 is connected to the fourth back flange 170 with a fourth bolt 184. With this construction, the second casing end portion 112 is driven toward the first casing end portion 110 when the plurality of bolts 172 are respectively tightened between the first plurality of flanges 130 and the second plurality of flanges 154.

Each set of corresponding front flanges 132, 134, 142, back flanges 160, 162, 170, and bolts 174, 180, 184 together forms a drive mechanism configured for driving the second casing end portion 112 toward the first casing end portion 110. Notably, various other mechanical or electromechanical configurations of attachment and driving means may be employed to attach the first casing end portion 110 and the second casing end portion 112, and to drive the second casing end portion 112 toward the first casing end portion 110 or alternatively drive the first casing end portion 110 to the second casing end portion 112 so as to compress the support 104 without departing from the scope of the present disclosure.

Figure 3:
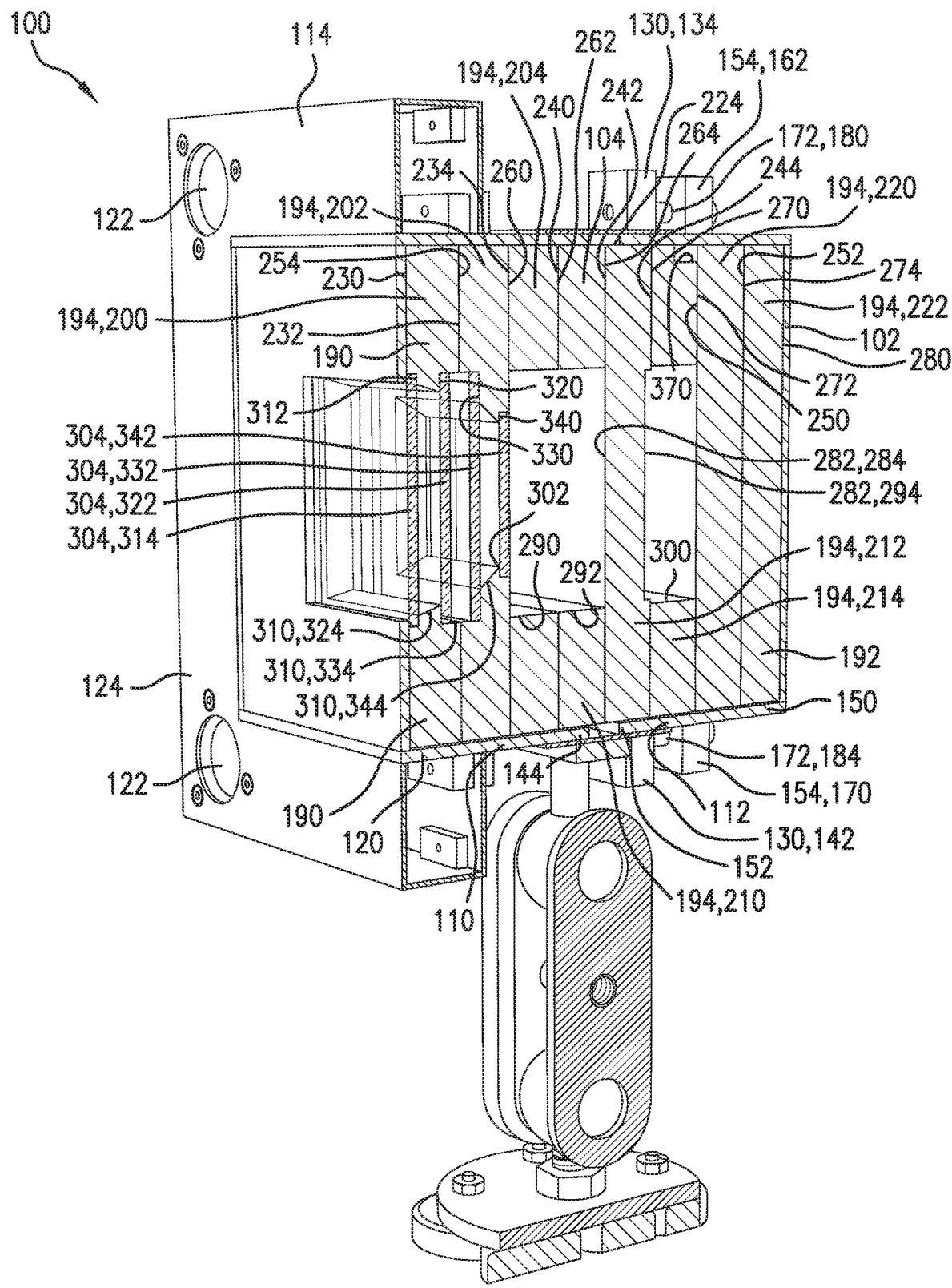
FIG. 3 is a cross-sectional perspective view of the housing.
Figure 4:
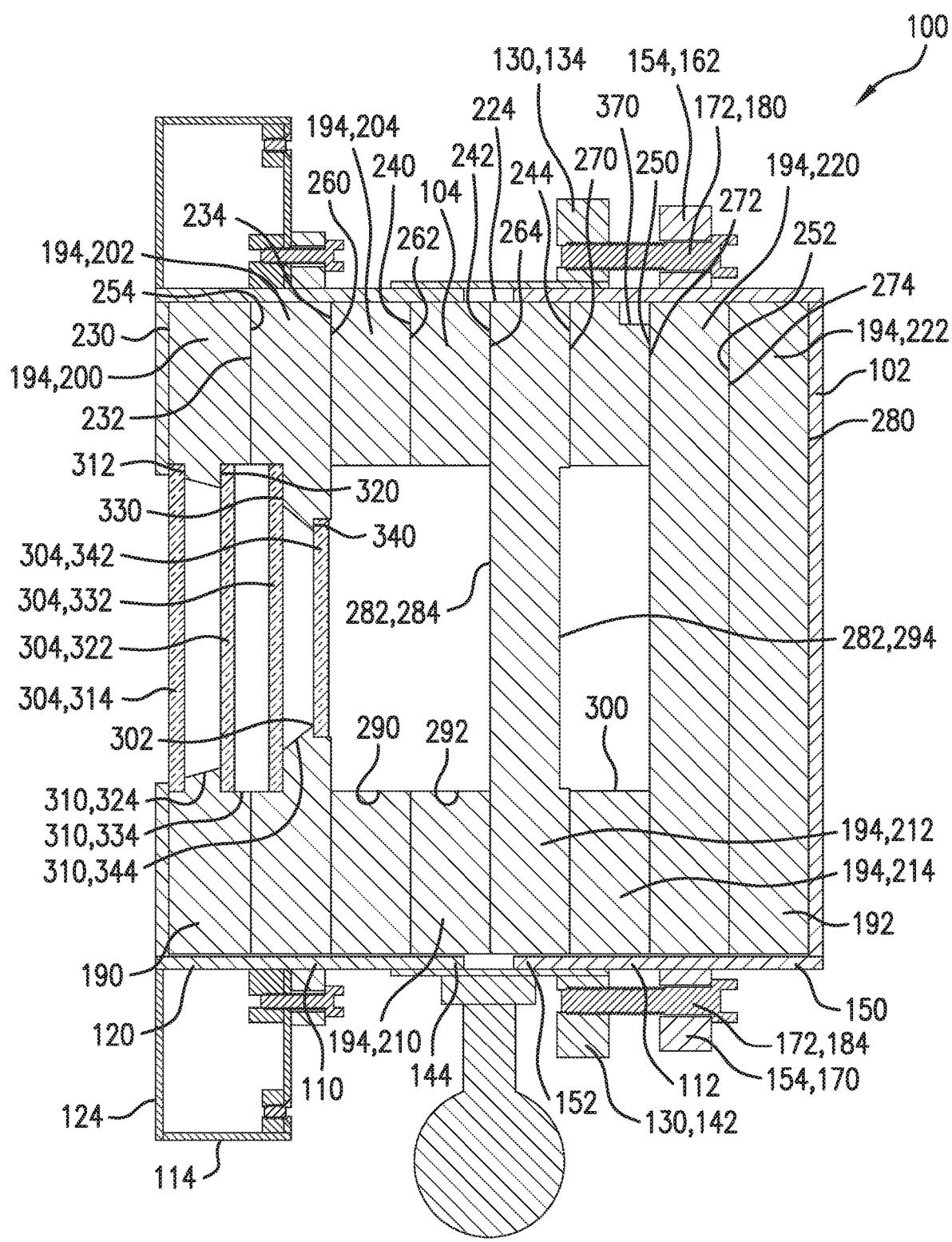
FIG. 4 is a cross-sectional side view of the housing.

As shown in FIGS. 3 and 4, the first casing end portion 110 is configured for accommodating a first support end portion 190 of the support 104, and the second casing end portion 112 is configured for accommodating a second support end portion 192 of the support 104, the first support end portion 190 being located on a side of the support 104 opposite the second support end portion 192. Assembling the support 104 between the first casing end portion 110 and the second casing end portion 112 presses the first support end portion 190 toward the second support end portion 192, compressing the support 104 between the first casing end portion 110 and the second casing end portion 112. In an embodiment, the casing 102 is an aluminum shell disposed around the support 104 to protect and compress the support 104, however various casing materials, thicknesses, and configurations may be employed to house, protect, and compress the support 104 without departing from the present application.

In the depicted embodiment, the support 104 is formed from a plurality of insulation layers 194 stacked with each other in a linear direction from the first support end portion 190 to the second support end portion 192. The plurality of insulation layers 194 are made from a material configured to inhibit conductive heat transfer. According to one aspect, the support 104 is formed from a first insulation layer 200, a second insulation layer 202, a third insulation layer 204, a fourth insulation layer 210, a fifth insulation layer 212, a sixth insulation layer 214, a seventh insulation layer 220, and an eighth insulation layer 222, and an outer periphery of each insulation layer 200-222 of the plurality of insulation layers defines a support exterior 224 of the support 104. Although, it should be appreciated that more or less than the depicted number of insulations layers can be provided for the support 104.

In FIG. 6, the plurality of insulation layers 194 are stacked flatly in the linear direction. A front surface 230 of the first insulation layer 200 defines a front surface of the support exterior 224. The plurality of insulation layers 194 are also stacked such that a front surface 232 of the second insulation layer 202, a front surface 234 of the third insulation layer 204, a front surface 240 of the fourth insulation layer 210, a front surface 242 of the fifth insulation layer 212, a front surface 244 of the sixth insulation layer 214, a front surface 250 of the seventh insulation layer 220, and a front surface 252 of the eighth insulation layer 222 respectively mate with a back surface 254 of the first insulation layer 200, a back surface 260 of the second insulation layer 202, a back surface 262 of the third insulation layer 204, a back surface 264 of the fourth insulation layer 210, a back surface 270 of the fifth insulation layer 212, a back surface 272 of the sixth insulation layer 214, and a back surface 274 of the seventh insulation layer 220. A back surface 280 of the eighth insulation layer 222 defines a back surface of the support exterior 224.

With reference to FIGS. 3 and 4, the support 104 has at least one compartment 282 defined within the plurality of insulation layers 194, the at least one compartment 282 being configured for accommodating at least one of a camera (not shown) and a battery (not shown). As depicted, the at least one compartment 282 includes a first compartment 284 and a second compartment 294, where each of the first compartment 284 and the second compartment 294 are airtight with respect to each other and the support exterior 224. The first compartment 284 is configured for accommodating a camera and can be formed between, for example, the second insulation layer 202 and the fifth insulation layer 212. The first compartment 284 can be formed from an insulation layer aperture 290 defined in, for example, the third insulation layer 204 (herein referred to as a "third" insulation layer aperture) and an insulation layer aperture 292 defined in, for example, the fourth insulation layer 210 (herein referred to as a "fourth" insulation layer aperture) and aligned with the third insulation layer aperture 290. The second compartment 294 is configured for accommodating a battery and can be formed between, for example, the fifth insulation layer 212 and the seventh insulation layer 220, from an insulation layer aperture 300 defined within the sixth insulation layer 214 (herein referred to as a "sixth" insulation layer aperture). A battery and other electric components in the high temperature video camera system 100 may be operatively connected to a magnetic power switch (not shown) configured for altering an operating state of the battery or electronic device with input provided from a distance, outside the support exterior 224. In an embodiment, the battery is operatively connected to the plurality of exterior lights 122 and operated with the magnetic power switch. The first compartment 284 and the second compartment 294 are distinct, and separated from each other by the fifth insulation layer 212. In this manner, heat generated by the battery disposed in the second compartment 294 is inhibited from transfer to the first compartment 284, protecting electrical components disposed in the first compartment 284 from heat generated in the second compartment 294.

When the support 104 is assembled within the casing 102 between the first casing end portion 110 and the second casing end portion 112, and the second casing end portion 112 is sufficiently driven toward the first casing end portion 110, the second support end portion 192 accommodated in the second casing end portion 112 is pressed toward the first support end portion 190 accommodated in the first casing end portion 110. Therefore, the casing 102 compresses the plurality of insulation layers 194 between the first casing end portion 110 and the second casing end portion 112 in the linear direction. When the support 104 is sufficiently compressed, immediately adjacent insulation layers in the plurality of insulation layers 194 form a hermetic seal between the respectively mated front surfaces 230-252 and back surfaces 254-280 of the insulation layers 200-222, and in this manner the first compartment 284 and the second compartment 294 are hermetically sealed from the support exterior 224. Notably, compressing the support 104 in the linear direction compresses the support 104 in a direction normal to the respectively mated front surfaces 230-252 and back surfaces 254-280, and is therefore advantageous for creating a seal between the insulation layers 200-222.

In an embodiment, the plurality of insulation layers 194 are formed from a polymer aerogel that is machinable and features relatively low value thermal conductivity properties. The insulation layers 200-222 formed from the polymer aerogel are shaped to have a uniform thickness with a corresponding flat, smooth front surface 230-252 and back surface 254-280 suitable for forming a seal with a like surface when similar insulation layers are compressed with each other. Notably, other compressible insulation materials may be employed without departing from the scope of the present application.

With continued reference to FIGS. 3 and 4, the plurality of insulation layers 194 features another aperture 302 defined therein. The aperture 302 extends between the front surface of the support exterior 224 and the first compartment 284 such that the first compartment 284 is open to ambient light from the support exterior 224 through the aperture 302. A plurality of lenses 304 are respectively fixed to the plurality of insulation layers 194 and disposed transversely across the aperture 302 such that the aperture 302 and the plurality of lenses 304 form at least one hermetically sealed chamber 310 that is airtight with respect to the support exterior 224 and the first compartment 284. Specifically, the front surface 230 of the first insulation layer 200 defines the front surface of the support exterior 224 and features a first front surface step 312 formed around a perimeter of the support 104 defining the aperture 302 at the front surface 230 of the first insulation layer 200. A first lens 314 of the plurality of lenses 304 is disposed on the first front surface step 312 of the first insulation layer transversely across the aperture 302. The first lens 314 continues the front surface 230 of the first insulation layer 200 as the support exterior 224 defined by the first insulation layer 200. The first insulation layer 200 also includes a first back surface step 320 formed around a perimeter of the support 104 defining the aperture 302 at the back surface 254 of the first insulation layer 200. A second lens 322 of the plurality of lenses 304 is disposed on the first back surface step 320 of the first insulation layer 200 transversely across the aperture 302. With this construction, the second lens 322 of the plurality of lenses 304 is disposed on an insulation layer spaced in the linear direction inward of the first lens 314 with respect to the support 104, forming a first hermetically sealed chamber 324 between the first lens 314 and the second lens 322.

The second insulation layer 202 features a second front surface step 330 formed around a perimeter of the support 104 defining the aperture 302 at the front surface 232 of the second insulation layer 202. A third lens 332 of the plurality of lenses 304 is disposed on the second front surface step 330 of the second insulation layer 202 transversely across the aperture 302. As such, the second lens 322 is disposed on an insulation layer spaced in the linear direction inward of the second lens 322 with respect to the support 104, forming a second hermetically sealed chamber 334 between the second lens 322 and the third lens 332. The second insulation layer 202 also includes a second back surface step 340 formed around a perimeter of the support 104 defining the aperture 302 at the back surface 260 of the second insulation layer 202. A fourth lens 342 of the plurality of lenses 304 is disposed on the second back surface step 340 of the second insulation layer 202 transversely across the aperture 302. With this construction, the fourth lens 342 of the plurality of lenses 304 is disposed on an insulation layer spaced in the linear direction inward of the third lens 332 with respect to the support 104, forming a third hermetically sealed chamber 344 between the third lens 332 and the fourth lens 342. In an embodiment, the plurality of lenses 304 are respectively sealed with the plurality of insulation layers 194 with a sealer, such as a resin, epoxy, or other adhesive suited for functionally maintaining respective seals between the plurality of lenses 304 and the plurality of insulation layers 194.

In an embodiment of the high temperature video camera system 100, the temperature insulation properties of the support 104 can be improved with a vacuum formed within each of the first hermetically sealed chamber 324, the second hermetically sealed chamber 334, and the third hermetically sealed chamber 344. Notably, a vacuum formed within the first hermetically sealed chamber 324, the second hermetically sealed chamber 334, and the third hermetically sealed chamber 344 is advantageous for minimizing convective heat transfer respectively through the first hermetically sealed chamber 324, the second hermetically sealed chamber 334, and the third hermetically sealed chamber 344. This minimizes convective heat transfer through the aperture 302 to the first compartment 284. In an embodiment, the plurality of lenses 304 are borosilicate glass lenses configured to structurally withstand force imparted thereon by the vacuum at high temperatures, however similar materials may be employed without departing from the scope of the present application. Furthermore, one having ordinary skill in the art would recognize that while forming a vacuum in the first hermetically sealed chamber 324, the second hermetically sealed chamber 334, and the third hermetically sealed chamber 344 is advantageous for preventing convective heat transfer to the first compartment 284, the same is not necessary for creating a high temperature video camera system 100 functional for thermally insulating the camera or other equipment in the first compartment 284.

Figure 5:
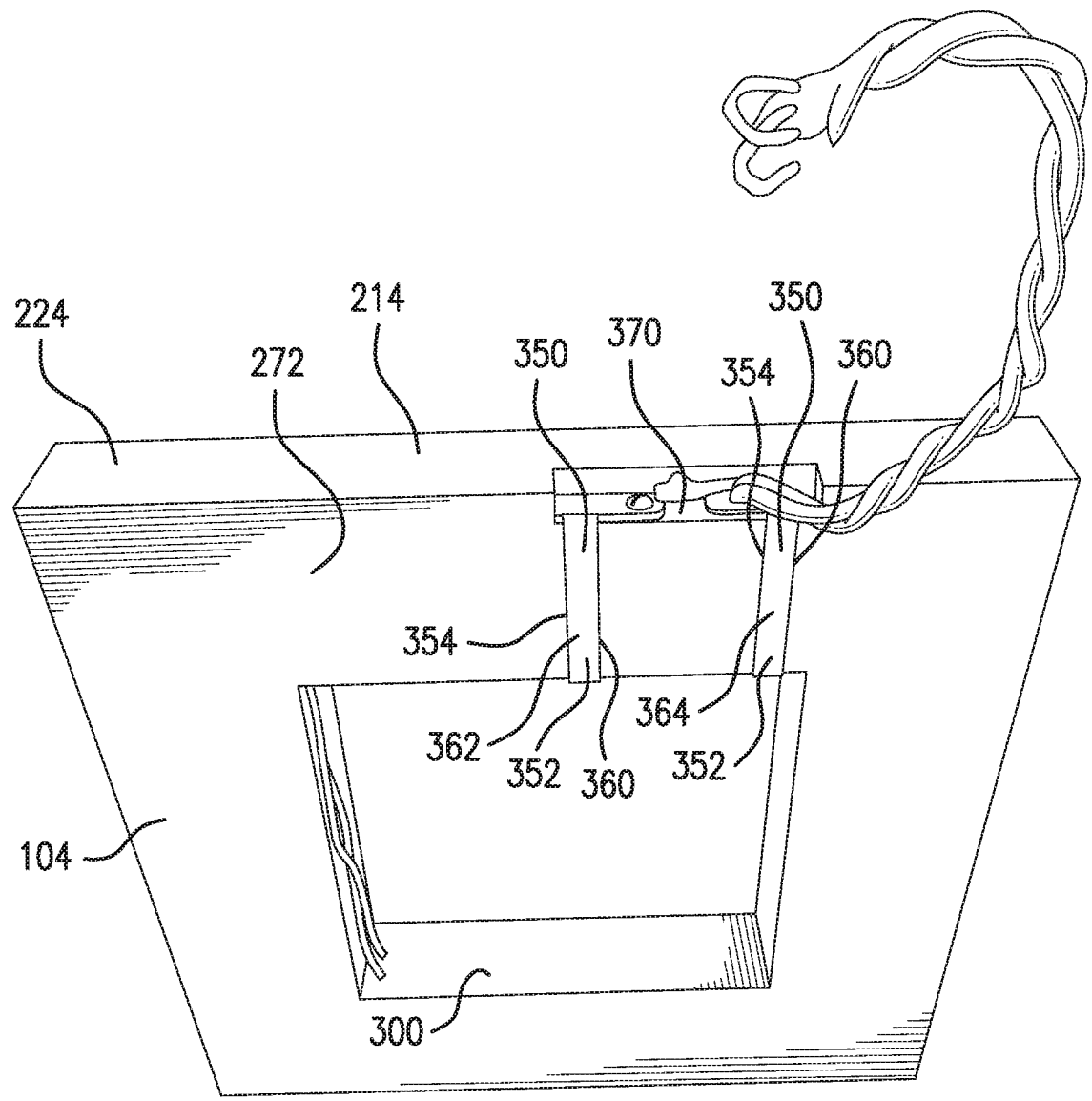
FIG. 5 is a perspective view of an insulation layer and a conductor configured for forming part of the housing.

According to the present disclosure, a conductor 350 extends from the second compartment 294 to the support exterior 224. The conductor 350 is layered with the plurality of insulation layers 194, and interposed between at least one pair of adjacent insulation layers of the plurality of insulation layers 194 (for example, the sixth insulation layer 214 and the seventh insulation layer 220) so as to extend from the second compartment 294 to the support exterior 224. As shown in FIG. 5, the conductor 350 is formed from ribbon wire having a lateral cross section that is proportionally flat as compared with a lateral cross section of round wire, the conductor 350 being elongated in a lateral direction of the support 104 that is perpendicular to the linear direction, and the conductor 350 is mounted to the support exterior 224. Notably, as compared with round wire, ribbon wire features a greater magnitude of surface area per longitudinal length of wire with a proportionally reduced width of the wire in the linear direction of the plurality of insulation layers 194.

More specifically, the conductor 350 is formed from ribbon wire having a first conductor surface 352 and a second conductor surface (not shown) on a side of the conductor 350 opposite the first conductor surface 352. Each of the first conductor surface 352 and the second conductor surface is extended in the lateral direction of the support 104 and featuring more surface area than a first edge 354 and a second edge 360 of the conductor 350. To form a circuit between electrical components such as a battery within the second compartment 294 and electrical components such as the plurality of exterior lights 122 which are external to the support 104, the conductor 350 includes a first conducting part 362 and a second conducting part 364. The first conducting part 362 extends from the second compartment 294 to the support exterior 224 and the second conducting part 364 is a distinct element that separately extends between the second compartment 294 and the support exterior 224 while electrically connected to the same circuit as the first conducting part 362. In an embodiment, the ribbon wire of the conductor 350 is formed from copper foil having a thickness of about 0.025 mm or less so as to fit between adjacent insulation layers such as the sixth insulation layer 214 and the seventh insulation layer 220 and maintain the hermetic seal at the support 104 around the conductor 350.

As shown in FIG. 5, each of the first conducting part 362 and the second conducting part 364 is mounted to an outer perimeter step 370 formed on an outer perimeter of the insulation layer so as to fix a position of the conductor 350 with respect to the support 104. To form a hermetic seal around the conductor 350 with the support 104, the conductor 350 is interposed between a pair of immediately adjacent insulation layers of the plurality of insulation layers 194 such that at least one of the first conductor surface 352 and the second conductor surface faces normal to the linear direction and each of the first conductor surface 352 and the second conductor surface is disposed along and contacts an insulation layer of the plurality of insulation layers 194. With this construction, the conductor 350 is sandwiched flatly between the pair of adjacent insulation layers from the plurality of insulation layers 194. In the depicted embodiment, the high temperature video camera system 100 is configured for interposing the conductor 350 between the sixth insulation layer 214 and the seventh insulation layer 220, where the sixth insulation layer 214 features the outer perimeter step 370 on which the conductor 350 is mounted.

As indicated previously, the casing 102 is configured for compressing the support 104 in the linear direction in which the plurality of insulation layers 194 are stacked, with the casing 102 disposed around the support 104 and compressing the support 104 so as to hermetically seal the pair of adjacent insulation layers disposed on the first conductor surface 352 and second conductor surface of the conductor 350. Specifically, the sixth insulation layer 214 and the seventh insulation layer 220 are sufficiently compressed so as to deform around the conductor 350 with sufficient force to hermetically seal the back surface 272 of the sixth insulation layer 214 with the front surface 250 of the seventh insulation layer 220 about the second compartment 294 from the support exterior 224.

According to one aspect, a method of assembling the high temperature video camera system 100 includes stacking the plurality of insulation layers 194 in the linear direction to form the support 104 such that the outer periphery of each insulation layer 200-222 of the plurality of insulation layers 194 defines the support exterior 224, and such that the support 104 has the at least one compartment 282 defined therein. The method includes disposing the conductor 350 interposed between a pair of immediately adjacent insulation layers of the plurality of insulation layers 194 such that the conductor 350 extends from the at least one compartment 282 to the support exterior 224, and compressing the support 104 in the linear direction so as to hermetically seal the pair of adjacent insulation layers around the conductor 350, and to hermetically seal the at least one compartment 282 from the support exterior 224.

According to one embodiment of the disclosed method, the step of stacking the plurality of insulation layers 194 includes stacking the plurality of insulation layers 194 so as to form the aperture 302 defined in the plurality of insulation layers 194, such that the aperture 302 extends between the support exterior 224 and the first compartment 284 of the at least one compartment 282, opening the first compartment 284 to light from the support exterior 224 through the aperture 302. The method also includes fixing the plurality of lenses 304 respectively to the plurality of insulation layers 194 across the aperture 302 such that the aperture 302 and the plurality of lenses 304 form the at least one hermetically sealed chamber 310, the at least one hermetically sealed chamber 310 being airtight from the support exterior 224 and the at least one compartment 282. In an alternative embodiment, the method may additionally include forming a vacuum in the at least one hermetically sealed chamber 310.

Assembling the support 104 with the casing 102 includes disposing the first support end portion 190 in the first casing end portion 110 and disposing the second support end portion 192 in the second casing end portion 112, and the step of compressing the support 104 includes compressing the support 104 in the linear direction between the first casing end portion 110 and the second casing end portion 112. With this construction, assembling the support 104 between the first casing end portion 110 and the second casing end portion 112 presses the first support end portion 190 toward the second support end portion 192, compressing the support 104 between the first casing end portion 110 and the second casing end portion 112.

According to an embodiment, the step of disposing the conductor 350 includes disposing the conductor 350 interposed between a pair of adjacent insulation layers of the plurality of insulation layers 194 such that the conductor 350 extends from the second compartment 294 to the support exterior 224. In the same or alternative embodiment of the method, the step of fixing the plurality of lenses 304 respectively to the plurality of insulation layers 194 includes fixing the first lens 314 to the first insulation layer 200 of the plurality of insulation layers 194 across the aperture 302, the first insulation layer 200 having the front surface 230 defining the front surface of the support exterior 224 with the first lens 314 continuing the front surface 230 of the first insulation layer 200 as the support exterior 224. The step of fixing the plurality of lenses 304 respectively to the plurality of insulation layers 194 includes fixing a second lens 322 to an insulation layer of the plurality of insulation layers 194 across the aperture 302 such that the second lens 322 is spaced in the linear direction inward of the first lens 314 with respect to the support 104, forming the first hermetically sealed chamber 324 of the at least one hermetically sealed chamber 310 between the first lens 314 and the second lens 322.

It will be appreciated that variations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A housing for a high temperature video camera system, the housing comprising:
a support having at least one compartment defined therein, the at least one compartment being airtight with respect to a support exterior and configured for accommodating at least one of an associated camera and an associated battery of the high temperature video camera system;
a plurality of insulation layers stacked in a linear direction to form the support including the at least one compartment, wherein an outer periphery of each insulation layer of the plurality of insulation layers defines the support exterior; and
a conductor layered with the plurality of insulation layers, the conductor interposed between at least one pair of immediately adjacent insulation layers of the plurality of insulation layers and extending in a lateral direction of the support from the at least one compartment to the support exterior,
wherein the at least one compartment includes a first compartment and a second compartment distinct and hermetically sealed from the first compartment by at least one of the plurality of insulation layers.

2. The housing according to claim 1, wherein the plurality of insulation layers is compressed such that immediately adjacent insulation layers in the plurality of insulation layers form a hermetic seal therebetween, and the at least one compartment is hermetically sealed from the support exterior.

3. The housing according to claim 2, wherein:
the support is disposed in a casing configured for compressing the support in the linear direction in which the plurality of insulation layers are stacked.

4. The housing according to claim 1, wherein the conductor is formed from ribbon wire having a lateral cross section that is elongated in the lateral direction of the support perpendicular to the linear direction, and a portion of the conductor is mounted to the support exterior.

5. The housing according to claim 1, further comprising:
an aperture defined in the plurality of insulation layers, the aperture extending between the support exterior and the first compartment of the at least one compartment such that the first compartment is open to ambient light from the support exterior through the aperture, wherein the aperture is airtight with respect to the support exterior.

6. The housing according to claim 5, wherein the conductor extends from the second compartment to the support exterior.

7. The housing according to claim 5, further comprising:
a plurality of lenses respectively fixed to the plurality of insulation layers and disposed across the aperture such that the aperture and the plurality of lenses form at least one hermetically sealed chamber that is airtight with respect to the support exterior and the first compartment.

8. The housing according to claim 7, further comprising:
at least one step formed in an insulation layer of the plurality of insulation layers, around a perimeter of the support defining the aperture,
wherein a lens of the plurality of lenses is disposed on the at least one step.

9. The housing according to claim 7, wherein:
a first insulation layer of the plurality of insulation layers has a front surface defining the support exterior,
a first lens of the plurality of lenses is disposed on the first insulation layer across the aperture and continues the support exterior defined by the first insulation layer;
a second lens of the plurality of lenses disposed on an insulation layer of the plurality of insulation layers across the aperture is spaced in the linear direction inward of the first lens with respect to the support; and
a chamber of the at least one hermetically sealed chamber is formed between the first lens and the second lens.

10. The housing according to claim 1, wherein the plurality of insulation layers are formed from a polymer aerogel.

11. A housing for a high temperature video camera system, the housing comprising:
a support having at least one compartment defined therein, the at least one compartment being airtight with respect to a support exterior and configured for accommodating at least one of an associated camera and an associated battery of the high temperature video camera system;
a plurality of insulation layers stacked with each other in a linear direction to form the support including the at least one compartment;
a conductor layered with the plurality of insulation layers, the conductor extending through at least one pair of immediately adjacent insulation layers included in the plurality of insulation layers forming the support, the conductor extending in a lateral direction of the support from the at least one compartment to the support exterior; and
a casing disposed around the support and compressing the support in the linear direction in which the plurality of insulation layers are stacked with the immediately adjacent insulation layers of the plurality of insulation layers forming a hermetic seal between respectively mated front surfaces and back surfaces of the plurality of insulation layers so as to hermitically seal the at least one pair of adjacent insulation layers around the conductor, and hermetically seal the at least one compartment from the support exterior.

12. The housing according to claim 11, wherein an outer periphery of each insulation layer of the plurality of insulation layers defines the support exterior.

13. The housing according to claim 12, wherein:
the conductor is formed from ribbon wire having a first conductor surface and a second conductor surface on a side of the conductor opposite the first conductor surface, each of the first conductor surface and the second conductor surface being extended in the lateral direction of the support perpendicular to the linear direction; and the conductor is interposed between the pair of adjacent insulation layers such that the first conductor surface and the second conductor surface face normal to the linear direction, the first conductor surface contacts one adjacent insulation layers, and the second conductor surface contacts the other adjacent insulation layer.

14. The housing according to claim 11, wherein:

the casing includes a first casing end portion configured for accommodating a first support end portion and a second casing end portion configured for accommodating a second support end portion; and wherein assembling the support between the first casing end portion and the second casing end portion presses the first support end portion toward the second support end portion, compressing the support between the first support end portion and the second support end portion.

15. The housing according to claim 11, wherein:

the at least one compartment includes a first compartment and a second compartment distinct and hermetically sealed from the first compartment; and the conductor extends from the second compartment to the support exterior.

16. A method for assembling a housing for a high temperature video camera system, the method comprising:

stacking a plurality of insulation layers in a linear direction to form a support such that an outer periphery of each insulation layer of the plurality of insulation layers defines a support exterior, and such that the support has at least one compartment defined therein;

disposing a conductor interposed between a pair of immediately adjacent insulation layers of the plurality of insulation layers such that the conductor extends in a lateral direction of the support from the at least one compartment to the support exterior; and compressing the support in the linear direction in which the plurality of insulation layers are stacked with the immediately adjacent insulation layers of the plurality of insulation layers forming a hermetic seal between respectively mated front surfaces and back surfaces of the plurality of insulation layers so as to hermitically seal the pair of adjacent insulation layers around the conductor layered with the plurality of insulation layers, and to hermetically seal the at least one compartment from the support exterior.

17. The method according to claim 16, wherein the step of stacking the plurality of insulation layers includes forming an aperture defined in the plurality of insulation layers, the aperture extending between the support exterior and a first compartment of the at least one compartment such that the first compartment is open to ambient light from the support exterior through the aperture, and the method further comprises:

fixing a plurality of lenses respectively to the plurality of insulation layers across the aperture such that the aperture and the plurality of lenses form at least one hermetically sealed chamber that is airtight from the support exterior and the at least one compartment.

18. The method according to claim 17, wherein the step of disposing the conductor includes disposing the conductor interposed between the pair of adjacent insulation layers of the plurality of insulation layers such that the conductor extends from a second compartment of the at least one compartment to the support exterior.

19. The method according to claim 17, wherein the step of fixing a plurality of lenses respectively to the plurality of insulation layers includes:

fixing a first lens to a first insulation layer of the plurality of insulation layers across the aperture, the first layer having a front surface defining the support exterior with the first lens continuing the front surface of the first insulation layer as the support exterior;

fixing a second lens to an insulation layer of the plurality of insulation layers across the aperture such that the second lens is spaced in the linear direction inward of the first lens with respect to the support; and forming a hermetically sealed chamber that is one of the at least one hermetically sealed chamber between the first lens and the second lens.

* * * * *